Dec. 26, 1944.  R. SARDESON  2,365,909
FOOD COOKING DEVICE
Filed Aug. 12, 1939  7 Sheets-Sheet 1

Inventor
Robert Sardeson
By Caswell & Lagaard
Attorneys

Inventor
Robert Sardeson
By Caswell & Lagaard
Attorneys

Dec. 26, 1944.  R. SARDESON  2,365,909
FOOD COOKING DEVICE
Filed Aug. 12, 1939   7 Sheets-Sheet 7

Inventor
Robert Sardeson
By Caswell & Lagaard
Attorneys

UNITED STATES PATENT OFFICE 2,365,909

FOOD COOKING DEVICE

Robert Sardeson, Minneapolis, Minn., assignor to Harold C. Genter, Miami Beach, Fla.

Application August 12, 1939, Serial No. 289,905

22 Claims. (Cl. 99—329)

My invention relates to food cooking devices and to operating mechanisms and timing mechanisms therefor and has for an object to provide a food cooking device which will be positive in action and accurate in results.

Another object of the invention resides in providing a food cooking device which will not get out of order and which will operate continuously without attention.

A still further object of the invention resides in providing a food cooking device which will operate without variations under varying conditions and which will give the same degree of cooking regardless of the initial temperature of the device.

Another object of the invention resides in providing a cooking device in which the food is shifted toward and from the heating means through a food shifting device and in which the food shifting device is held in food cooking position by means of a latch and against the action of resilient means tending to move the food shifting means out of food cooking position.

An object of the invention resides in providing a device of such character in which the latch is positively disengaged with a minimum amount of effort and in which the disengagement thereof is extremely positive.

A still further object of the invention resides in providing a food cooking device in which timing is procured by means of a thermally responsive member heated through a heater and moved to successively expose different portions of the said thermally responsive member to the heater.

Another object of the invention resides in providing a food cooking device in which the thermally responsive member is constructed to form a rack meshing with a pinion and in which a detent actuated by the thermally responsive member engages a ratchet movable with the pinion.

A feature of the invention resides in providing means operated by the pinion for disengaging the latch.

Another object of the invention resides in providing separate resilient means for operating the pinion and rack.

An object of the invention resides in providing means for energizing said second named resilient means upon movement of the bread shifting means from operative to inoperative position.

Another object of the invention resides in providing means operated through movement of the bread shifting means from operative to inoperative position for re-setting the rack and pinion.

A feature of the invention resides in providing a dash pot or cushioning means capable of cushioning the operation of the rack and pinion, as well as the bread shifting means.

Another object of the invention resides in providing means for bodily raising the thermally responsive member to disengage the detent from the ratchet to procure rapid operation of the device and quick return of the bread shifting means to in-operative position.

Other objects of the invention reside in the novel combination and arrangement of parts and in the details of construction hereinafter illustrated and/or described.

In the drawings:

Fig. 9 is a wiring diagram of the invention.

This application is a continuation in part of my Patent No. 2,332,171 for Thermal timing mechanism, issued October 19, 1943.

The instant invention is of the type wherein portions of food are cooked at different times and in which the cooking device is intermittently operated, being energized only when in use and deenergized at the end of each cooking period. To facilitate reference to such types of devices, I have referred to the invention in the specification and claims as an intermittently operated food cooking device.

Figure 1:
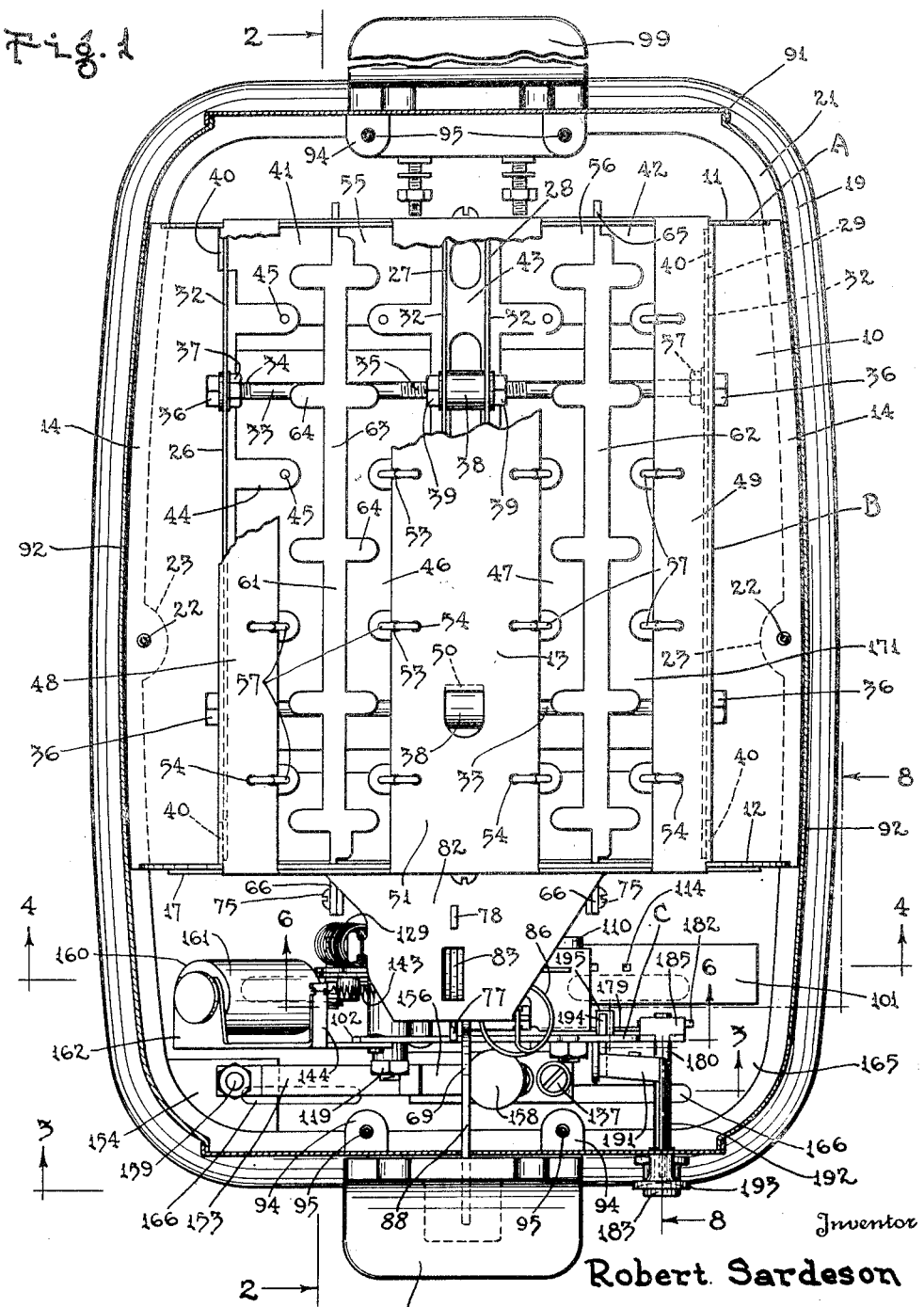
Fig. 1 is a plan view of a bread toaster with a portion thereof cut away and illustrating an embodiment of my invention.

My invention comprises a frame A, best shown in Fig. 1. This frame carries within itself a toaster B and at an outside portion of the same a timing mechanism C for timing the operation of the toaster. These various parts will now be described in detail.

Figure 2:
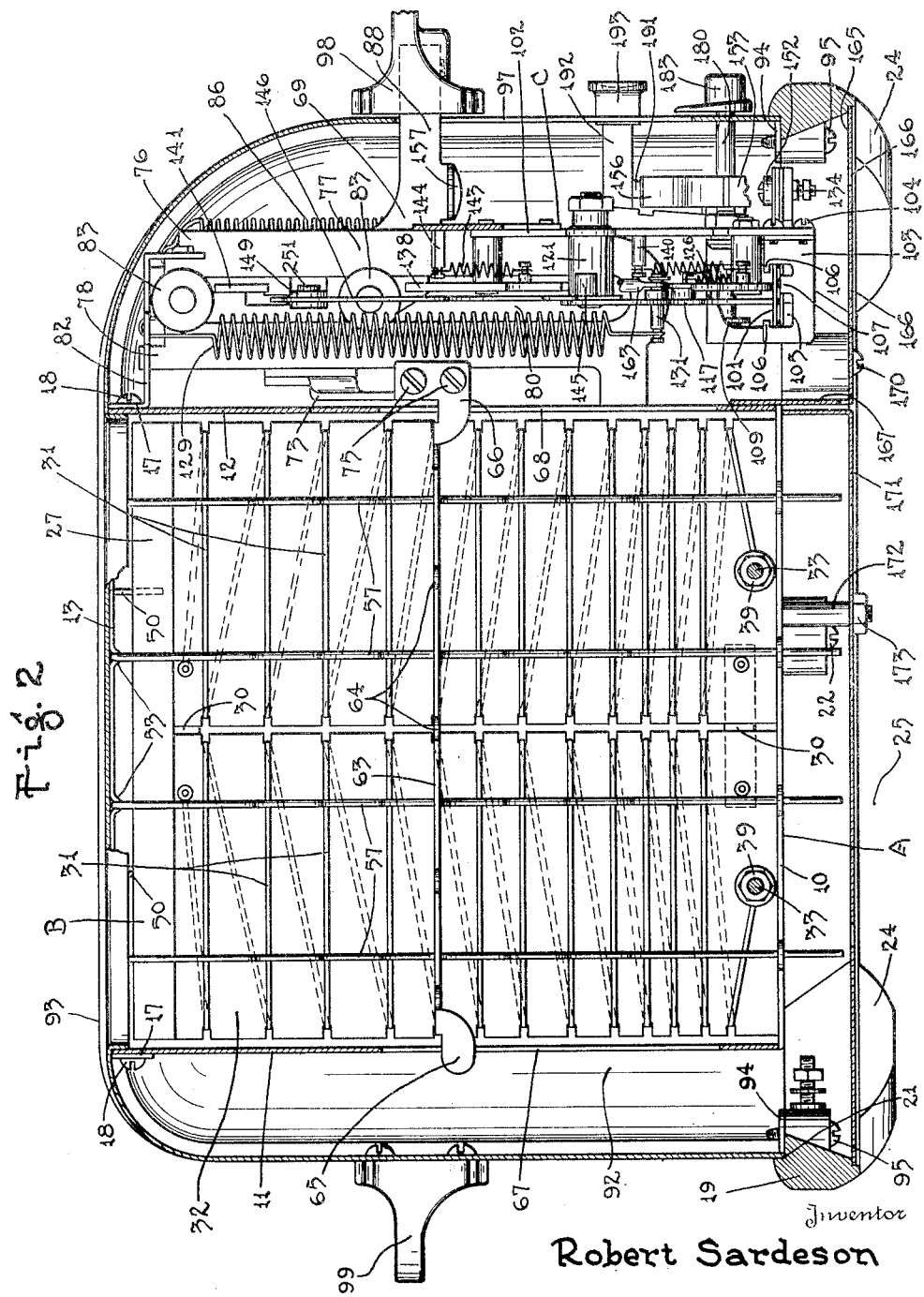
Fig. 2 is an elevational sectional view taken on line 2—2 of Fig. 1.

The frame A is best shown in Fig. 2 and consists of a lower horizontal frame member 10 constructed from sheet metal and two vertical end frame members 11 and 12 bent upwardly from the frame member 10. The frame further includes an upper horizontal frame member 13 which connects the two frame members 11 and 12 together at their upper ends. The lower frame member 10, as best shown in Fig. 1, has marginal portions 14 at the sides thereof which extend outwardly beyond the lateral confines of the vertical frame members 11 and 12. The upper frame member 13 is provided with downturned flanges 17 which are secured to the end frame members 11 and 12 by means of bolts 18.

Figure 3:
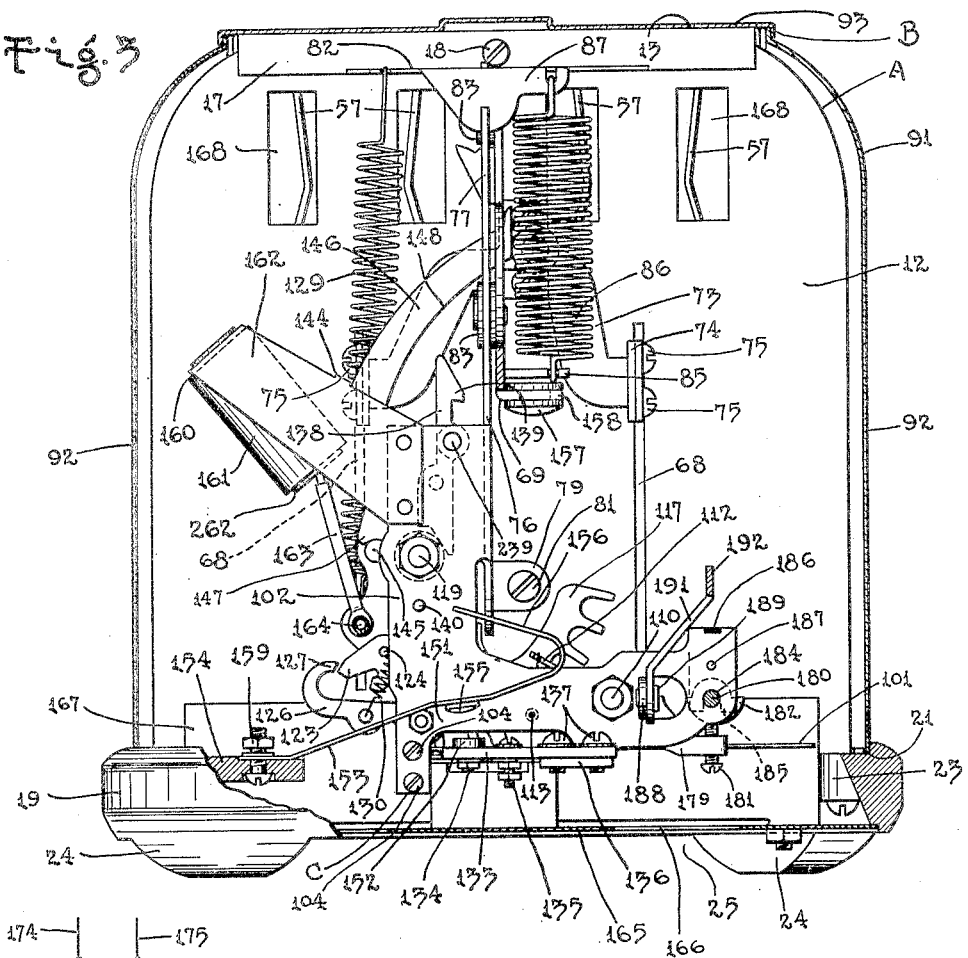
Fig. 3 is an elevational sectional view taken on line 3—3 of Fig. 1.

The frame A is supported on a base 19, best shown in Figs. 1, 2 and 3, which is constructed from a suitable molded material and extends about the outer confines of the toaster, being open in the center. This base is constructed with a circumferentially extending rabbet 21 therein in which the portions 14 of the lower frame member 10 of frame A rests. Said frame is held attached to the base 19 by means of screws 22 which are threaded in the portions 14 of the frame and pass through ears 23 issuing inwardly from the base 19. The base 19 is constructed with feet 24 which raise the base above the surface on which the toaster rests and provides spaces 25 therebetween for the admission of air into the toaster proper.

The toaster B is constructed in the following manner: Disposed between the two end frame members 11 and 12 are four heating elements 26, 27, 28 and 29. Each of these heating elements is constructed from two sheets of suitable heat resisting insulating material 32 on which are wound heating coils 31 constructed of resistance wire or ribbon. The two sheets of insulating material 32 of each heating element are connected together by means of metallic connectors 30 which overlie the same and are riveted thereto. The heating elements 26, 27, 28 and 29 are secured together through threaded spindles 33 which are upset at the centers and ends to receive threads 34 and 35. These spindles pass through the various sheets of insulating material 32 and the sheets forming heating elements 26 and 29 are supported thereon through nuts 36 and 37. Between the sheets of insulating material from which heating elements 27 and 28 are constructed are disposed sleeves 38 which hold the same in spaced relation. These sheets are held supported on the spindles by means of nuts 39 which are screwed up against the same. In this manner all of the heating elements 26, 27, 28 and 29 are connected together as a unit through the spindles 33 and rest directly on the lower frame member 10 of the frame A. The heating elements 26, 27, 28 and 29 are held in position on the lower frame member 10 by means of lugs 40 which are struck up from the lower frame member 10.

The frame member 10 of frame A is constructed with two longitudinally extending openings 41 and 42 which leave a center bar 43 and the portions connected to the portions 14 of said base. These openings are so formed as to provide a number of lugs 44 which project outwardly from the edges of the portions 14 and the bar 43 of the lower frame member 10. The lugs have holes 45 formed in the same. The upper frame member 13 is constructed similarly to the lower frame member 10 and is formed with two longitudinally extending openings 46 and 47 which provide marginal portions 48 and 49 at the sides of the said frame member and a central portion 51. All of these parts are connected together through the flanges 17 of the said upper frame member, previously referred to. The marginal portions 48 and 49 of the frame member 13 have their outer edges turned down to form downwardly extending flanges 52. In the central portion 51 of the upper frame member 13 is struck out lugs 50 which extend downwardly therefrom. These lugs and the flanges 52 serve to hold the upper ends of the heating elements 26, 27, 28 and 29 in proper position relative to the upper frame member 13. The other edges of the marginal portions 48 and 49 and the central portion 51 have notches 53 formed in the edges thereof which lie directly above the holes 45 in the lugs 44 of the lower frame member 10. In addition, these portions of the upper frame member are formed with holes 54 disposed in correspondence with the notches 53, which holes are disposed inwardly from the edges of said portions of the frame member.

Figure 5:
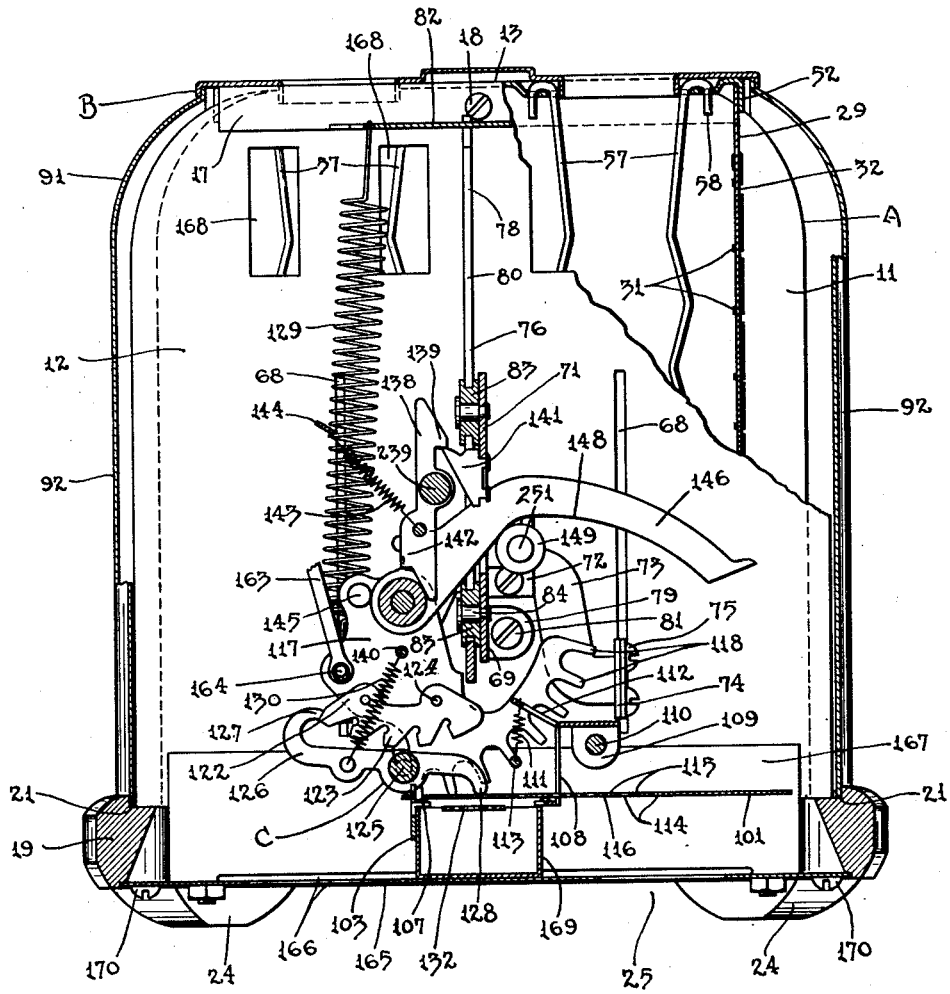
Fig. 5 is a view similar to Fig. 4 showing the parts in toasting position.

The four heating elements 26, 27, 28 and 29 form two bread ovens which are indicated in their entireties by the reference numerals 55 and 56. Bread is inserted into these ovens from the upper open ends thereof and is held in position by a number of guard wires 57. These wires are shown in detail in Fig. 5 and are supported from the upper and lower frame members 13 and 10. The lower ends of these guard wires extend directly through the openings 45 in the lugs 44, while the upper ends thereof are received within the notches 53. These guard wires at their upper ends have hooks 58 formed thereon which project through the holes 54 and hold the guard wires in position. The guard wires are preferably made zig-zag in form to cause the same to engage the bread at isolated localities to prevent formation of streaks on the toast.

Disposed within the two bread ovens 55 and 56 and movable between the sets of guard wires 57 are two bread racks 61 and 62. One of these bread racks is shown in detail in Fig. 2 and consists of a bar 63 of sheet metal, which is constructed with lugs 64 projecting outwardly therefrom at the longitudinal edges thereof. This bar has formed at the ends thereof ears 65 and 66 which are bent at right angles to said bar and which project through vertical slots 67 and 68 formed in the end frame members 11 and 12.

Figure 4:
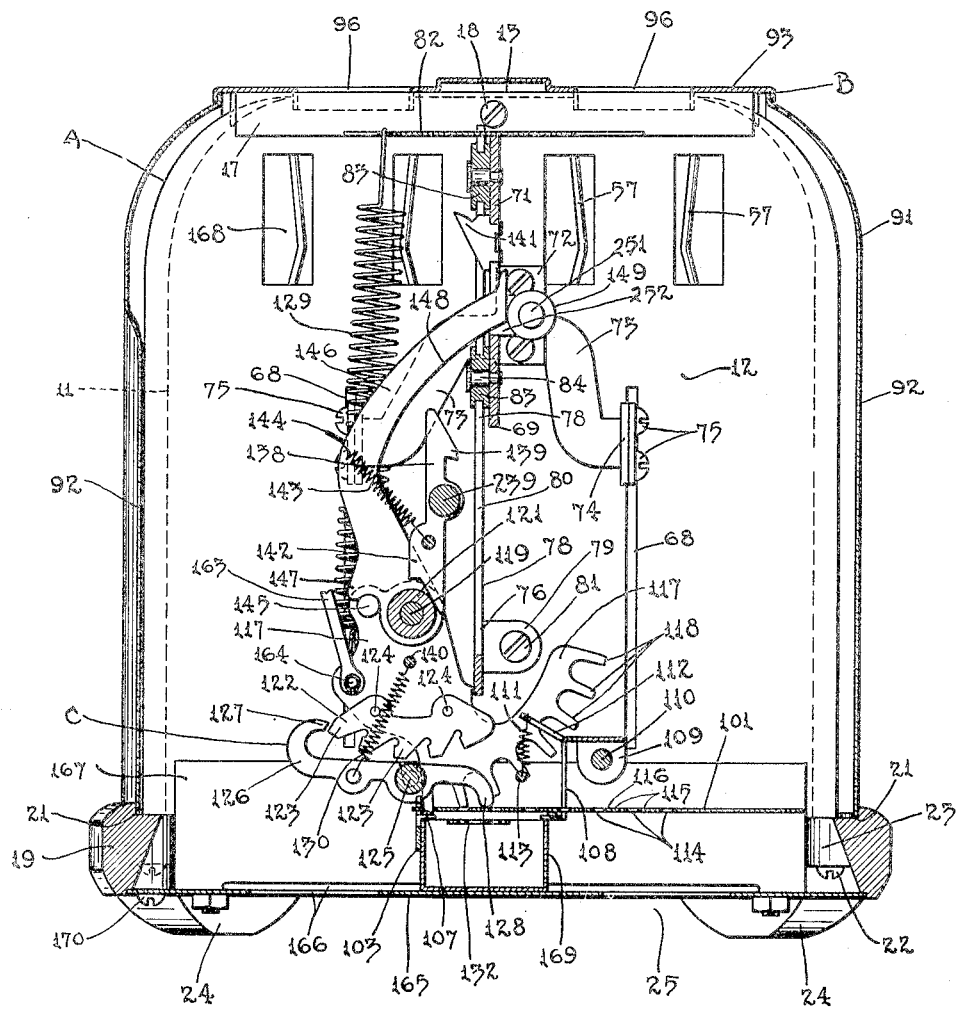
Fig. 4 is an elevational sectional view taken on line 4—4 of Fig. 1 and showing the parts in non-toasting position.

The bread racks 61 and 62 are supported on a carriage 69, best shown in Figs. 3 and 4. This carriage consists of a plate 71 having a flange 72 turned outwardly therefrom. Attached to this flange is a forked arm 73, formed with lugs 74 bent outwardly therefrom and parallel with the slots 67 and 68. The ears 66 of the bread racks 61 and 62 project beyond the end frame member 12 and are secured to the lugs 74 by means of screws 75. In this manner the two bread racks are rigidly supported on the carriage 69 and are adapted to move vertically along the slots 67 and 68 through guidance of the said carriage.

The carriage 69 is guided for vertical movement in the following manner: Attached to the end frame member 12 of frame A is a support 76. This support is constructed from sheet metal and is formed to provide two spaced uprights 77 and 78. These uprights are spaced to provide a slot 80 extending through the said support. The lowermost portion of the support 76 is formed with an attaching lug 79 which is bent outwardly therefrom and which is attached to the end frame member 12 by means of a screw 81. The upper ends of the uprights 77 and 78 extend through and are attached to a bracket 82 which projects outwardly from and is integral with the flange 17 of the upper frame member 13. This bracket is apertured to receive the ends of said uprights and hold the same in proper relation to one another and to the frame A. The carriage 69 is provided with two grooved rollers 83 which engage the edges of the uprights 77 and 78 at the slot 80 and which are pivoted on pintles 84 attached to the said carriage. By means of this construction the carriage is guided for vertical sliding movement and the two bread carriages 61 and 62 are supported and correspondingly guided for movement within the bread ovens 55 and 56.

The carriage 69, as best shown in Fig. 3, has a lug 85 projecting outwardly therefrom. One end of a tension coil spring 86 is hooked on the lug 85 and the other end of said spring is hooked on another lug 87, formed on the bracket 82. This spring provides the energy for raising the toast carriage 69 and the two bread racks 61 and 62 when the toasting operation is completed.

The entire toaster B and timing mechanism C are enclosed by means of a case 91. This case has lateral walls 92 and a top 93 connected therewith and is open at the bottom. The lower ends of the lateral walls 92 rest in the rabbet 21 of base 19. Issuing inwardly from the end walls of the said case are ears 94 which are threaded to receive screws 95. These screws pass through ears similar to the ears 23 which are formed on the base 19 and underlie said ears 94. The top 93 of case 91 is constructed with two longitudinally extending openings 96 which are directly disposed above the bread ovens 55 and 56 and which guide slices of bread into the said ovens between the sets of guard wires 57.

In initiating operation of the toaster, the carriage 69 is moved to its lowermost position by means of an arm 88, best shown in Fig. 2. This arm projects outwardly through a slot 97 in the end wall of the case 91 and has attached to its outer end a finger piece 98 by means of which the said arm may be depressed. When pressure is applied to the said finger piece, carriage 69 is lowered against the action of spring 86 and the toast racks 61 and 62 brought into toasting position. The case 91 is also provided with a stationary finger piece 99, similar to the finger piece 98, which finger pieces may be used for carrying the toaster about.

The timing mechanism C of my invention consists of a strip of bi-metal 101, shown in Figs. 1 and 4, which is movable in the direction of its length and is guided for movement in the following manner. Issuing outwardly from the upright 77 of support 76 is a flange 102. This flange has secured to the lowermost end thereof a guide 103 which is attached to said flange through screws 104. This guide has a central opening 105 through which the bi-metal extends and is provided with ears 106 extending into said opening to restrain movement of the bi-metal out of the same. A button 107, formed on the guide 103 serves as a support for the bi-metal throughout its travel along the said guide. The strip of bi-metal 101 is further guided for movement in a similar guide 108 which is pivoted to the flange 102 of support 76. For this purpose the said guide is constructed with two ears 109 which are journalled on a stub shaft 110 fast on the flange 102. A tension spring 111 is hooked at one end to a finger 112 on the guide 108 and at its other end on a pin 113 secured to the flange 102. This spring holds the guide 108 in its lowermost position, as shown in Fig. 4.

The strip of bi-metal 101 is constructed with a series of openings 114 arranged in spaced relation throughout the length thereof. These openings leave intervening portions 115 which form a rack indicated in its entirety by the reference numeral 116. Cooperating with the rack 116 is a segment of a pinion 117 which has teeth 118 adapted to mesh with the openings 114 of rack 116. This pinion segment is attached to a shaft 119 which is journalled in a bearing 121 secured to the flange 102. By means of this construction the pinion segment 117 rotates and the rack 116 moves lengthwise coincidentally. The pinion segment 117 has attached to it a small section 122 of a ratchet wheel, which is provided with ratchet teeth 123. This ratchet section is spaced from the pinion 117 and is secured thereto in concentric relation with reference to the teeth 118 by means of rivets 124. Pivoted on a stud 125 issuing outwardly from the flange 102 of support 76 is a detent 126 which has a catch 127 adapted to engage the various teeth 123 of the ratchet section 122. The detent 126 is provided with a finger 128 which rides along the upper surface of the strip of bi-metal 101 and to one side of the row of openings 114 therein. Finger 128 is held in engagement with the strip of bi-metal 101 by means of a tension coil spring 130 which is attached to one end to detent 126 and at its other end to a pin 140 issuing outwardly from the flange 102 of support 76. When the bi-metal bows upwardly, finger 128 is raised and the catch 127 of detent 126 is disengaged from the particular tooth 123 of ratchet section 122 with which the same was engaged. Rotation of the pinion segment 117 in a clockwise direction is procured by means of a tension coil spring 129 which is hooked at one end to the bracket 82 and at its other end to a pin 131 issuing outwardly from the pinion 117. By means of this spring, movement of the strip of bi-metal 101 toward the left is procured when the detent 126 is successively disengaged from the ratchet teeth 123.

Operation of the detent 126 is caused by the heating of the strip of bi-metal 101 at a locality between the two guides 103 and 108. For this purpose a heater 132 is employed which is attached to an insulated mounting 133, by means of two screws 134 and 135. The mounting 133 is attached to a lug 136 bent outwardly from the flange 102 of support 76 by means of screws 137. The mounting 133 is disposed outwardly of the said flange, best shown in Fig. 8. This heater is disposed immediately below the undersurface of the strip of bi-metal as shown in Figs. 4, 5, 6, 7 and 10.

The carriage 69 is latched in its lowermost position by means of a latch 138. This latch is pivoted on a stud 239 secured to flange 102 of support 76. Said latch has a catch 139 which is adapted to engage a latch lug 141 attached to the carriage 69. The said latch 138 is constructed with a finger 142 which engages bushing 121 and limits movement of the catch 139 into latching position. A tension coil spring 143 secured at one end to the finger 142 and at its other end to a spring support 144, carried by the flange 102 urges the latch 138 into latching position. Mounted on the pinion segment 117 is a pin 145. When the last tooth of the teeth 123 of the ratchet section 122 has been released by the detent 126, spring 129 causes continued rotation of the pinion segment 117 and urges the pin 145 into engagement with the finger 142 of latch 138. This disengages the catch 139 from the latch lug 141 and frees the carriage which is raised to its uppermost position through the action of the spring 86.

For returning the pinion segment 117 to normal position, a cam 146 is employed which is pivoted on the shaft 119. This cam has a shoulder 147 which is adapted to engage the pin 145 on the pinion segment 117. The said cam also has a cam surface 148 which is adapted to be engaged by a roller 149, rotatably mounted on a stud 251 secured to a lug 252 issuing outwardly from the carriage 69. As the carriage 69 travels upwardly, said roller engages surface 148 and brings the shoulder 147 into engagement with pin 145, moving the pinion segment 117 in a counter-clockwise direction thus the resetting of the timer, including the tensioning of its actuating spring 129 is effected coincidentally with the upward movement of the carriage.

For controlling the energization of the heating elements 26, 27, 28 and 29, a switch, indicated in its entirety by the reference numeral 151, is employed. This switch utilizes the screw 134 holding heater 132 in place which screw is constructed with a contact head 152. A leaf spring switch arm 153 is attached to an insulating support 154 by means of a screw 159. This support, as best shown in Fig. 1, issues outwardly from and is made as a part of the base 19. The arm 153 has a contact 155 which is adapted to engage the contact 152. The end of the arm 153 is bent back, as indicated at 156 to form an engaging portion adapted to be engaged by an insulating button 157, attached to a bracket 158 extending outwardly from the carriage 69. When the carriage 69 is lowered, button 157 engages the engaging portion 156 of arm 153 and brings the contact 155 into engagement with the contact 152 thereby closing the circuit through the switch 151.

Figure 7:
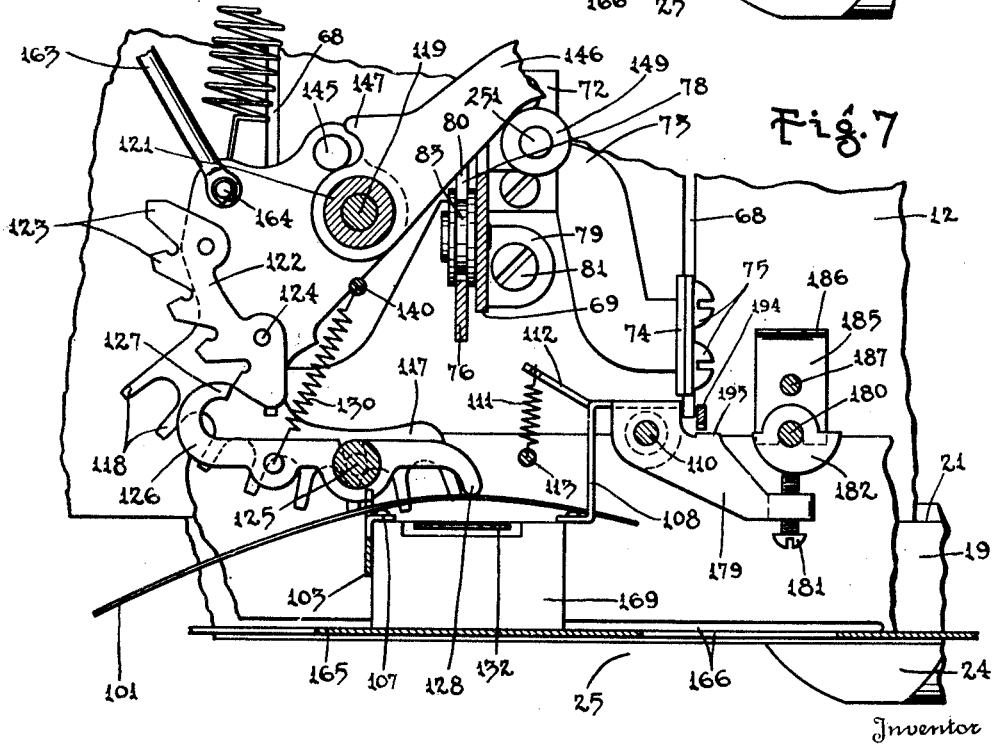
Fig. 7 is a view similar to Fig. 6 showing the parts substantially at the end of a timing cycle.
Figure 8:
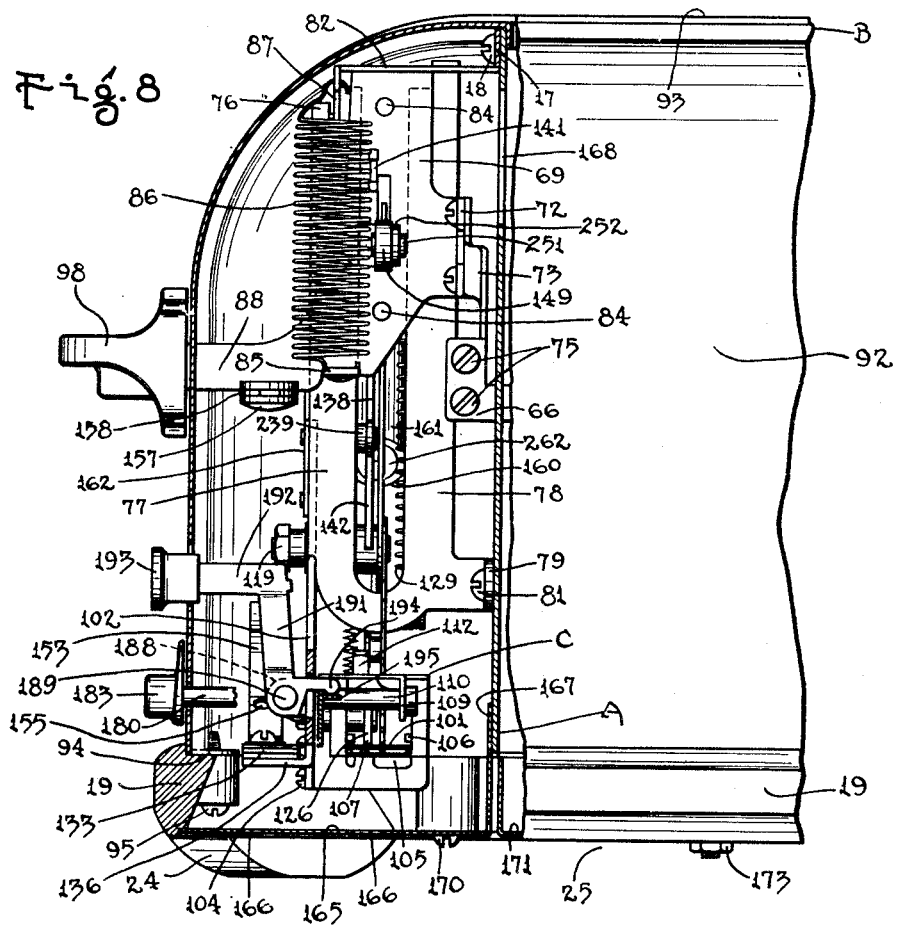
Fig. 8 is a fragmentary elevational sectional view taken on line 8—8 of Fig. 1.
Figure 10:
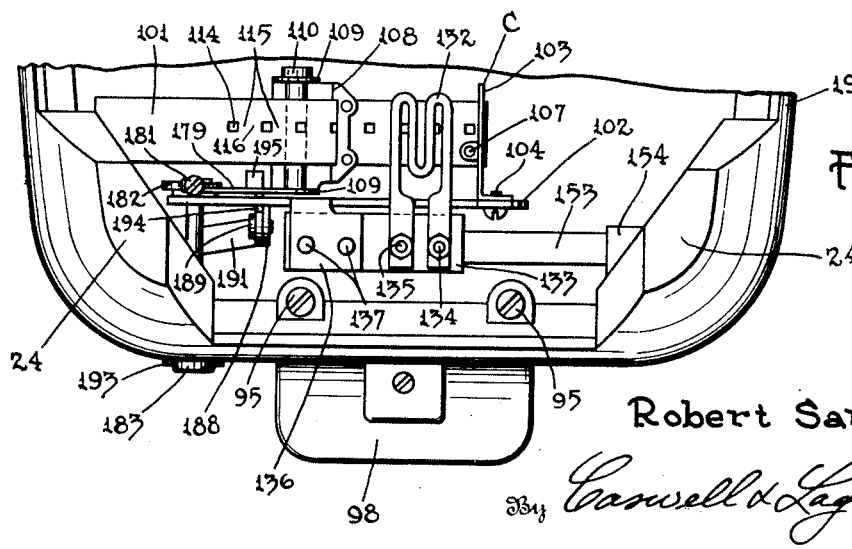
Fig. 10 is an inverted view of a portion of the structure shown in Fig. 1.

Variations in the brownness of the toast toasted by the invention is procured by moving the movable guide 108 for the strip of bi-metal 101 in a manner to raise and lower the right hand portion of the bi-metal, as viewed in Fig. 4. This varies the amount of engagement 127 of detent 126 with the teeth 123 of the ratchet section 122. It will readily be comprehended that, when this portion of the bi-metal is raised, less arching of the bi-metal will be necessary to disengage catch 127 from the tooth 123 with which it was engaged, thereby reducing the length of time necessary to release the detent from each tooth of the ratchet section with which it is engaged. As best shown in Fig. 7, the guide 108 is constructed with an arm 179 projecting outwardly therefrom. This arm has screwed in it an adjusting screw 181 which is adapted to engage the surface of a cam 182. Cam 182 is secured to a shaft 180 which projects outwardly through a suitable hole 184 in the case 91 and has attached to it a knob 183 by means of which the same may be rotated. Shaft 180 is journalled for rotation in a hole drilled in the flange 102, best shown in Fig. 3.

Friction is afforded between the cam 182 and the flange 102 through a spring 185 which overlies the outer surface of said cam. This spring has an abutment 186 at its upper end which engages the flange 102. A rivet 187 passing through said spring and the flange 102 urges the lowermost end of the said spring into engagement with cam 182 and effects the desired result.

Manual release of the bread carriage 69 may be accomplished in the following manner: Pivoted to a lug 188 through a rivet 189 is a lever 191. This lever has an arm 192 extending outwardly therefrom which projects through a suitable opening in the case 91. A button 193, attached to the end of this finger permits of pressing the finger inwardly. Lever 191 is formed with an arm 194 extending through the flange 102 of support 76, which arm is adapted to engage a lug 195 formed on the arm 179. When the button 193 is pressed inwardly, lever 191 is oscillated to depress arm 179. This raises the bi-metal guide 108 sufficiently to move the detent 126 out of engagement with the teeth 123 of ratchet section 122. The bi-metal is then permitted to travel from the right to the left, movement thereof being procured through the spring 129. When the pin 145, on the pinion segment 117 engages the finger 142 of latch 138, the bread carriage 69 is released and the bread racks 61 and 62 move to their uppermost position.

In order to cushion the action of the device, I employ a dash pot 160. This dash pot comprises a cylinder 161 which is mounted on a mounting 162, secured to the flange 102 of support 76. Said dash pot further includes a piston 262 which has pivoted to it a connecting rod 163. Connecting rod 163 is in turn pivoted to a pin 164 fast on the pinion segment 117. Leakage in the dash pot 160 is procured by constructing the piston 262 sufficiently loose so that air may travel past the same at the desired rate to procure the cushioning effect sought. As the bi-metal is released step-by-step, the movement thereof is cushioned so as to prevent shock and reduce the noise which would otherwise be occasioned by such movement. Such cushioning action takes place during the movement of the piston along the dash pot cylinder 161. When the carriage 69 is raised to its uppermost position through the action of spring 86, shoulder 147 of cam 146 engages pin 145 and moves the pinion segment 117 in a counter-clockwise direction. This draws the piston 262 out of the cylinder 161 of the dash pot 160. Such action thus cushions the release of the carriage, thereby eliminating shock to the apparatus and reducing the noise which would otherwise be occasioned by the release of the carriage.

Ventilation in the portion of the case 91 in which the timing mechanism is disposed, is controlled by the following construction. A plate 165 is employed which is disposed along the underside of the base 19 and which is attached thereto by means of screws 170. This plate has a flange 167 extending upwardly therefrom which is adapted to overlie the vertical frame member 12 of the frame A. In the plate 165 are formed various openings 166 which control the entry of air into the portion of the case 91 in which the timing mechanism is disposed. The air entering this portion of the case escapes through openings 168 in the end frame member 12 and passes outwardly from the case 91 through openings 96 in the top 93 thereof. The heater 132 is completely enclosed about the sides and from beneath the same by means of a housing 169 which is secured to the plate 165.

In this manner, separate air currents strike the bi-metal on opposite sides of the heater, so that the bi-metal moves from one air current into the other when passing the heater. By means of this construction, greater accuracy in toasting can be procured when initiation of operation of the toaster occurs at different temperatures.

For the purpose of collecting the bread crumbs from the bread deposited in the toast ovens 55 and 56, a crumb pan 171 is employed which is disposed beneath the frame A and which is attached to the base 19 by means of studs 172, secured to the lower frame member 10, and nuts 173 screwed upon the lower threaded ends of the same.

In Fig. 9 I have shown a wiring diagram of the invention. Current is received from any suitable source of supply by means of leads 174 and 175 connected therewith. The lead 175 is connected to the coils 31 of the heating elements 26, 27, 28 and 29 of the invention, which coils are all connected in multiple and further connected to a conductor 176. This conductor is connected to the screw 135 which attaches the heater 132 to the blank 133. The screw 134 provides the contact 152 of switch 151. The arm 153 of this switch is connected by means of a conductor 177 to the lead 174, previously referred to.

The operation of the invention is as follows: When the parts are in the position of disuse, the same are situated as shown in Figs. 1, 2, 3 and 4. It will be here noted that the finger piece 98 is in its uppermost position and that the carriage 69 and the bread racks 61 and 62 are uppermost. While in this position the bread is placed into the ovens 55 and 56 by inserting the same through the openings 96 in the top 93 of case 91. Finger piece 98 is then depressed. This lowers carriage 69 and the bread racks 61 and 62 carried thereby. Such movement continues until the latch lug 141 engages the catch 139 on the latch 138. Such movement tensions the coil spring 86. When the button 157 engages the engaging portion 156 of arm 153 of switch 151, the said arm is deflected downwardly until contact 155 engages contact 152 and closes switch 151. The circuit through the heater 132 and the heating elements 26, 27, 28 and 29 are now completed. While the carriage 69 is moving downwardly, cam 146 follows with it until the same takes the position shown in Fig. 5. While so moving the shoulder 147 on said cam moves away from the pin 145 on the pinion segment 117, thereby permitting the said pinion segment to move through the action of the spring 129, except as restrained by the detent 126. It is to be noted that, while in such position, the spring 129, which causes movement of the pinion segment 117 is also energized so that, as soon as the said segment is released by the detent 126, the segment rotates about the shaft 119.

Figure 6:
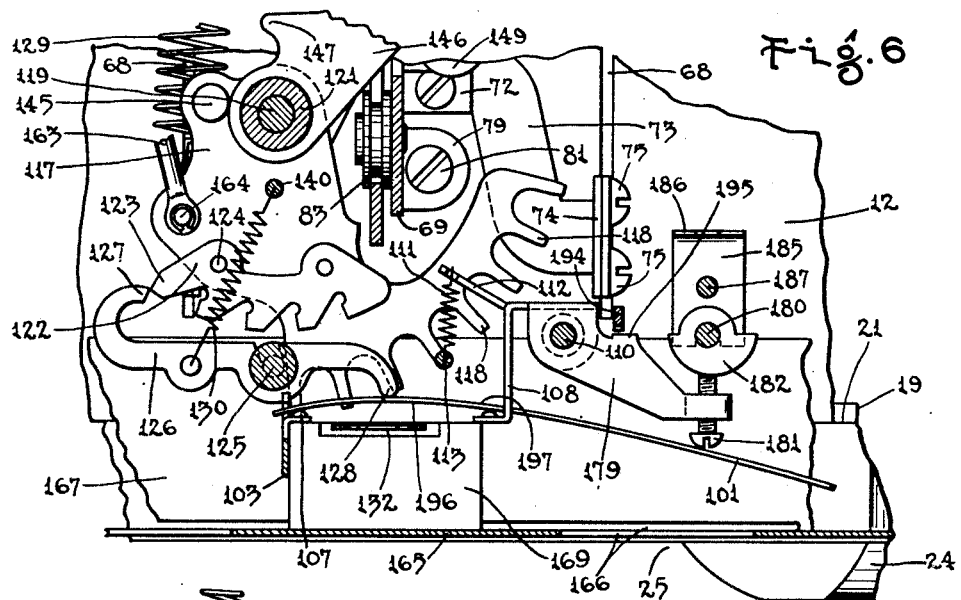
Fig. 6 is a fragmentary elevational sectional view taken on line 6—6 of Fig. 1 and drawn to a greater scale and showing the disposition of the parts at the beginning of a timing cycle.

As the electrical current passes through the heater 132, heat is transmitted to the strip of bi-metal 101 which commences to flex. This forms a hump in the strip of bi-metal directly above the heater, as designated at 196 in Fig. 6. This hump engaging the finger 128 of detent 126 raises the said finger and moves the catch 127 out of engagement with the first of the teeth 123 of the ratchet section 122. Such movement continues until the said catch is completely out of engagement, whereupon the spring 129 gives the pinion segment 117 rotation. The position of the catch 127 just about to release the tooth 123 with which it is associated is shown in Fig. 6. Inasmuch as the pinion segment 117 meshes with the teeth 115 of the rack 116 on the strip of bi-metal 101, the said pinion slides the bi-metal along the two guides 103 and 108 and moves the hump 196 to the left of the guide 103, when viewed as in Fig. 6. The adjoining portion 197 of the strip 101 being relatively flat, the finger 128 is again lowered and the catch 127 brought into a position to engage the second tooth of the ratchet section 122. The heater 132, being continuously energized during the operation of the toaster, heat is now transmitted to the portion 197 of the strip of bi-metal 101 and the said portion caused to act in the manner previously described. This releases the second tooth of the ratchet section and the pinion segment 117 rotates further. In this manner the said pinion segment is given a step-by-step rotation through the continuous operation of the heater 132 and the strip of bi-metal 101 progressively advanced to present unheated relatively flat portions of the same to the action of the heater.

When the detent 126 engages the last tooth 123 of the ratchet section 122, the parts become situated, as shown in Fig. 7. In this position the strip of bi-metal 101 is near the end of its travel. When the detent 126 finally releases the ratchet section 122, spring 129 completes movement of the pinion segment 117. This causes pin 145 to strike the finger 142 of latch 138. Such movement disengages the catch 139 from the latch lug 141 and frees the carriage 69. Spring 86, having been tensioned in the initial operation of the device, now moves the carriage upwardly and raises the toast out of toasting relation with respect to the heating elements 26, 27, 28 and 29. During movement of the carriage 69 upwardly, roller 149 engages the cam surface 148 of cam 146 and swings the said cam in a counter-clockwise direction, as viewed in Figs. 4 and 5. Shoulder 147 is, during such movement of the cam, brought into engagement with pin 145 and swings the pinion segment 117 in a counter-clockwise direction. This tensions the spring 129 and at the same time re-sets the said pinion segment and shifts the strip of bi-metal 101 back to normal position. The parts are now ready to complete another cycle which is initiated as previously described. During the movement of the pinion segment 117, both in the clockwise and counter-clockwise direction of rotation the dash pot 161 serves to cushion the movement and to prevent undue jar to the toaster. At the same time the noise which would otherwise be occasioned is greatly reduced.

During the step-by-step movement of the thermally responsive member 101, heater 132 is continuously energized. While the previously heated portions of said member cool after having passed the heater, the rate of cooling is considerably slower than the rate of heating and the amount of heat retained by the entire thermally responsive member continuously increases during the cooking period. While the temperature of the thermally responsive member at different portions of the same may not be the same, the average temperature of said thermally responsive member increases during the cooking period until the maximum average temperature is reached which occurs when the cooking cycle is terminated and the heater deenergized. The heat retained by the thermally responsive member at the end of a cooking cycle is utilized to control the duration of the following cooking period to produce the same degree of cooking regardless of the temperature of the cooking oven. This is procured by the proper selection of composition and size of thermally responsive member 101 and the size of the draft openings 168 and 168. In this manner, the cooling rate of the entire thermally responsive member, when the heater is de-energized, is coordinated with the cooling rate of the cooking oven so that regardless of the instant at which the next period is initiated, a coordinated release of the movable bread carrier and termination of the cooking period is effected which gives the same degree of cooking for every cooking period.

If, at any time, during the toasting operation it becomes desirable to rapidly terminate the toasting operation and prior to the automatic termination thereof, the same can be accomplished by pressing the button 193 inwardly. This swings lever 191 and depresses the arm 179, whereby the guide 108 is elevated to raise the position of the strip of bi-metal 101 at the right hand portion thereof. The raising of the strip of bi-metal in this manner and likewise the finger 128 of detent 126 disengages the catch 127 from engagement with any of the teeth 123 of the ratchet section 122. The spring 129 now causes rapid movement of the pinion segment 117, which results in the immediate release of the bread carriage in identically the same manner as previously described.

Variations in the timing of the timing device C may be procured by adjusting the shaft 188. This rotates cam 182, shifting the arm 179 one way or the other, and correspondingly raising or lowering the guide 108 for the strip of bi-metal 101.

Due to the fact that at the conclusion of a toasting operation the entire strip of bi-metal has been heated and is at a higher temperature throughout its extent than at the initiation of the toasting operation, it will be readily comprehended that less time is required for reheating the same to procure release of the bread carriage. This characteristic is relied upon to decrease the length of time required for a second slice of toast immediately inserted into the toast ovens or inserted therein prior to the complete cooling of the thermally responsive member back to room temperature.

The advantages of my invention are manifest. An extremely simple and practical construction is provided without the use of the conventional clock mechanism, whereby toasting may be satisfactorily procured. With my invention the toaster may be operated the required length of time without the attendant previously encountered difficulties in utilizing a single or even two thermally responsive members. A greater time period may be had with my invention if found desirable. With my invention toast can be successively formed of any color with decided uniformity of color. My invention is automatically compensated so that the same degree of color of the toast may be procured regardless of the temperature of the toaster at the initiation of the toasting operation. With my invention the latches and other mechanism are positively released so that timing becomes very accurate. My invention employs a minimum number of parts and will not readily get out of order. Less power is required to energize my invention than devices in which spring actuated clocks are used.

Changes in the specific form of my invention, as herein disclosed, may be made within the scope of what is claimed without departing from the spirit of my invention.

Having described my invention, what I claim as new and desire to protect by Letters Patent is:

1. In a food cooking device, heating means, food shifting means for moving the food toward and from the heating means, resilient means for moving the food shifting means from operative to inoperative position, a latch for holding said food shifting means in its operative position, a movable member adapted to move during a cooking period, said member being movable in opposite directions, resilient means for urging movement of said movable member in one direction, said movable member when moved in such direction disengaging said latch, a detent for restraining movement of said movable member, and a timing mechanism for moving said detent out of restraining position at the end of a cooking cycle.

2. In a food cooking device, heating means, food shifting means for moving the food toward and from the heating means, resilient means for moving the food shifting means from operative to inoperative position, a latch for holding said food shifting means in its operative position, a movable member, adapted, when in one position, to disengage said latch, resilient means for urging movement of said movable member to such position, and cushioning means operative to cushion both the movement of said food shifting means occasioned by said first resilient means and the movement of said movable member procured by said second resilient means.

3. In a food cooking device, heating means, food shifting means for moving the food toward and from the heating means, resilient means for moving the food shifting means from operative to inoperative position, a latch for holding said food shifting means in its operative position, a movable member, adapted, when in one position, to disengage said latch, resilient means for urging movement of said movable member to such position, cushioning means including a restrained member having retarded movement, said member, during movement in one direction, cushioning the movement of said food shifting means occasioned by said first named resilient means and said restrained member when moving in the other direction cushioning the movement of said movable member occasioned through the action of the second resilient means.

4. In a food cooking device, heating means, food shifting means for moving the food toward and from the heating means, resilient means for moving the food shifting means from operative to inoperative position, a latch for holding said food shifting means in its operative position, a movable member, adapted, when in one position, to disengage said latch, resilient means for urging movement of said movable member to such position, and a dashpot having a piston and a cylinder, one thereof being movable relative to the other, said piston and cylinder upon relative movement in one direction cushioning the movement of said food shifting means occasioned by said first named resilient means and upon relative movement in the other direction cushioning the movement of said movable member occasioned by the second named resilient means.

5. In a timing device, a thermally responsive member comprising a strip of bi-metal, said strip having a series of openings therein forming a rack, guide means for guiding said strip for movement in the direction of its extent, a heater for heating a portion only of said thermally responsive member to cause localized deflection thereof, said heater being fixed relative to said guide means, motive means for moving said thermally responsive member to subject different portions of said thermally responsive member to said heater, during the cooling of previously heated portions thereof including a rotary member, ratchet teeth on said rotary member, a detent for engagement with said ratchet teeth, means on said detent for engagement with said thermally responsive member at the locality of said heater, said means upon deflection of said thermally responsive member disengaging said detent from said ratchet teeth, and manually operable means for raising said guide means to cause premature raising of said thermally responsive member to disengage the detent from the ratchet teeth and permit rapid movement of said rotary member.

6. In a timing device, a thermally responsive member comprising a strip of bi-metal, said strip having a series of openings therein forming a rack, guide means for guiding said strip for movement in the direction of its extent, a heater for heating a portion only of said thermally responsive member to cause localized deflection thereof, said heater being fixed relative to said guide means, motive means for moving said thermally responsive member to subject different portions of said thermally responsive member to said heater, during the cooling of previously heated portions thereof including a rotary member, ratchet teeth on said rotary member, a detent for engagement with said ratchet teeth, means on said detent for engagement with said thermally responsive member at the locality of said heater, said means upon deflection of said thermally responsive member disengaging said detent from said ratchet teeth, and manually operable means for bodily moving said thermally responsive member in the direction of movement procured through said heater for operating the means contacting with said thermally responsive member to disengage the detent from the ratchet teeth and procure rapid movement of the rotary member.

7. In a food cooking device, heating means, food shifting means for moving the food toward and from the heating means, resilient means for moving the food shifting means from operative to inoperative position, a latch for holding said food shifting means in its operative position, a thermally responsive member guided for movement in a predetermined direction, stops movable with said thermally responsive member in the direction of movement thereof, a stop device including a movable toothed member for engagement with said stops, resilient means for urging movement of said toothed member and thermally responsive member, a heater adapted to procure localized deflection of said thermally responsive member at each of a number of positions controlled by said stops, means operated by the deflections of said thermally responsive member for releasing said stop device to procure step by step movement of said thermally responsive member, means operated by the movement of said toothed member for disengaging said latch and cushioning means connected to said toothed member, said cushioning means retarding the movement of said thermally responsive member at each step in the movement thereof and retarding the movement of said food shifting means upon its return to inoperative position.

8. In a food cooking device, heating means, food shifting means for moving the food toward and from the heating means, resilient means for moving the foot shifting means from operative to inoperative position, a latch for holding said food shifting means in its operative position, a timing device for releasing said latch at the end of the cooking period, cushioning means including a movable member adapted to be moved by said food shifting means during its movement from operative to inoperative position, said cushioning means retarding the movement of said food shifting means during such movement, and means operated by said timing device for resetting the movable member of the cushioning means during the timing operation of the timing device.

9. In a thermal timing mechanism, a thermally responsive member, means for guiding said member for movement in a certain direction, means for urging movement of said thermally responsive member in such direction, a stop device comprising stops movable with said thermally responsive member and stop means for engagement with said stops for arresting movement of said thermally responsive member, said stop means including a movable member, a heater positioned to procure localized deflection of said thermally responsive member at each of a plurality of positions determined by said stop device, the deflections of said member intermittently rendering effective the engagement between said stop means and said stops to procure step by step movement of said thermally responsive member and cushioning means connected to the movable member of said stop means and acting throughout the movement thereof to cushion each step of the movement of the thermally responsive member.

10. In a periodically operable food cooking device adapted to cool after the cooking period and reusable before complete cooling, heating means, a timing device for determining the duration of the cooking period and for deenergizing the heating means, said timing device including a thermally responsive member, a heater for heating said thermally responsive member to procure operation of said timing device, means for bringing said thermally responsive member into one air current during the cooking period to control the duration of the following cooking period, and means for bringing the thermally responsive member after heating into another air current to further control the duration of the following cooking period.

11. In a periodically operable food cooking device adapted to cool after the cooking period and reusable before complete cooling, heating means, a timing device for determining the duration of the cooking period and for deenergizing the heating means, said timing device incuding a a movable thermally responsive member, a heater for heating said thermally responsive member to procure operation of said timing device, means for procuring two currents of air, said thermally responsive member prior to a cooking period being subject to one of the currents of air and means operable during the cooking period for moving said thermally responsive member into the other current of air.

12. In a periodically operable food cooking device adapted to cool after the cooking period and reusable before complete cooling, heating means, a timing device for determining the duration of the cooking period and for deenergizing the heating means, said timing device including a movable thermally responsive member, a heater for heating said thermally responsive member to procure operation of said timing device, means for producing a current of air on one side of said heater, means for producing a current of air on the other side of the heater and means for causing movement of the thermally responsive member from one current of air, across the heater and into the other current of air.

13. In a periodically operable food cooking device adapted to cool after the cooking period and reusable before complete cooling, heating means, a timing device for determining the duration of the cooking period and for deenergizing the heating means, said timing device including a thermally responsive member in the form of a sheet disposed in a substantially horizontal plane and guided for movement in said plane, a heater disposed at one locality for heating said thermally responsive member, means for forming two substantially vertical air currents disposed in the path of movement of said thermally responsive member, and means for causing movement of the thermally responsive member from one current of air, across the heater and into the other current of air.

14. In a food cooking device, heating means, food shifting means for moving the food toward and from the heating means, resilient means for moving the food shifting means from operative to inoperative position, a latch for holding said food shifting means in its operative position, a thermally-responsive member comprising a strip of bi-metal, guide means for guiding said strip for movement in its direction of extent, a heater for heating a portion only of said thermally responsive member to cause localized deflection thereof, said heater being fixed relative to said guide means, motive means for moving said thermally responsive member to subject different portions of said thermally responsive member to said heater, during the cooling of previously heated portions thereof, a movable member engaging said thermally responsive member and movable in accordance therewith, stop means engaging said movable member and restraining movement of said movable member and thermally responsive member, means operated through deflection of said thermally responsive member for disengaging said stop means, means for varying the depth of engagement of said stop means with said movable member and means operated by said movable member for disengaging said latch.

15. In a food cooking device, heating means, food shifting means for moving the food toward and from the heating means, resilient means for moving the food shifting means from operative to inoperative position, a latch for holding said food shifting means in its operative position, a thermally responsive member comprising a strip of bi-metal, guide means for guiding said strip for movement in its direction of extent, a heater for heating a portion only of said thermally responsive member to cause localized deflection thereof, said heater being fixed relative to said guide means, a rotary member, means for procuring corresponding movement of said rotary member and thermally responsive member, resilient means for urging simultaneous movement of said rotary member and thermally responsive member in one direction, ratchet teeth on said rotary member, a detent for cooperation with said ratchet teeth, means on said detent for engagement with the thermally responsive member and adapted to be moved through deflections of said thermally responsive member to disengage the detent from the ratchet teeth, an arm pivoted for swinging movement about the axis of said rotary member, an abutment on said arm, an abutment on said rotary member disposed in the path of movement of said first abutment, a cam surface on said arm, a cam follower movable with the food shifting means and adapted to engage said cam surface, said follower bringing the abutments into engagement and causing resetting of said rotary member, when the food shifting means is moved in one direction, said abutments separating during movement of the rotary member in the opposite direction and latch means operated by said rotary member for disengaging said latch.

16. In a food cooking device, heating means, food shifting means for moving the food toward and from the heating means, resilient means for moving the food shifting means from operative to inoperative position, a latch for holding said food shifting means in its operative position, a thermally responsive member comprising a strip of bi-metal, guide means for guiding said strip for movement in its direction of extent, a heater for heating a portion only of said thermally responsive member to cause localized deflection thereof, said heater being fixed relative to said guide means, motive means for moving said thermally responsive member to subject different portions of said thermally responsive member to said heater, during the cooling of previously heated portions thereof, a movable member engaging said thermally responsive member and movable in accordance therewith, stop means engaging said movable member and restraining movement of said movable member and thermally responsive member, means operated through deflection of said thermally responsive member for disengaging said stop means, a movable cam, an abutment on said cam, an abutment on said movable member disposed in the path of movement of said first abutment, a cam follower movable with said food shifting means and adapted to engage said cam, said follower bringing the abutments into engagement and causing resetting of said movable member when the food shifting means is moved in one direction, said abutments separating during movement of the movable member in the other direction and means operated by said movable member for disengaging said latch.

17. In a food cooking device, heating means, food shifting means for moving the food toward and from the heating means, resilient means for moving the food shifting means from operative to inoperative position, a latch for holding said food shifting means in its operative position, a thermally responsive member comprising a strip of bi-metal, guide means for guiding said strip for movement in its direction of extent, a heater for heating a portion only of said thermally responsive member to cause localized deflection thereof, said heater being flexed relative to said guide means, a rotary member, means for procuring corresponding movement of said rotary member and thermally responsive member, resilient means for urging simultaneous movement of said rotary member and thermally responsive member in one direction, ratchet teeth on said rotary member, a detent for cooperation with said ratchet teeth, means on said detent for engagement with the thermally responsive member and adapted to be moved through deflections of said thermally responsive member to disengage the detent from the ratchet teeth, an arm pivoted for swinging movement about the axis of said rotary member, an abutment on said arm, an abutment on said rotary member disposed in the path of movement of said first abutment, means acting between said arm and food shifting means and adapted to bring the abutments into engagement and cause resetting of said rotary member when the food shifting means is moved in one direction, said abutments separating during movement of the rotary member in the opposite direction and means operated by said rotary member for disengaging said latch.

18. In a periodically operable food cooking device adapted to cool after the cooking period and reusable before complete cooling, heating means, a timing device for determining the duration of the cooking period and for deenergizing the heating means, said timing device including a thermally responsive member, a heater for heating said thermally responsive member to procure operation of said timing device, enclosing means for enclosing said heater to provide a confined heated space thereabout, means for ventilating the space exteriorly of said enclosing means and means for causing movement of portions of said thermally responsive member from the ventilated space to the heated space to control the subsequent operation of the thermally responsive member.

19. In a periodically operable food cooking device, heating means, food shifting means for moving the food toward and from the heating means, resilient means for moving the food shifting means from operative to inoperative position, a latch for holding said food shifting means in operative position, timing means for determining a cooking period, said timing means including a movable member adapted to operate said latch and release said food shifting means and means operable by said resilient means on release of said food shifting means and during movement of said food shifting means from operative to inoperative position to energize said timing means for subsequent operation.

20. In a periodically operable food cooking device, heating means, food shifting means for moving the food toward and from the heating means, resilient means for moving the food shifting means from operative to inoperative position, a latch for holding said food shifting means in operative position, timing means for determining a cooking period, said timing means including a movable member adapted to operate said latch and release said food shifting means, resilient means for urging movement of said movable member to actuate said timing means, and means operable upon release of said food shifting means to energize said second resilient means from said first resilient means upon movement of said food shifting means from operative to inoperative position.

21. In a periodically operable food cooking device, heating means, food shifting means for moving the food toward and from the heating means, resilient means for moving the food shifting means from operative to inoperative position, a latch for holding said food shifting means in operative position, timing means for determining a cooking period, said timing means including a movable member adapted to operate said latch and release said food shifting means, resilient means for urging movement of said movable member to actuate said timing means, means operable upon release of said food shifting means to energize said second resilient means from said first resilient means upon movement of said food shifting means from operative to inoperative position, and cushioning means having a movable member operable in opposite directions, said member, upon movement in one direction, cushioning the action of said first resilient means and upon movement in the opposite direction, cushioning the action of said second resilient means.

22. In an intermittently operated food cooking device, heating means, manual means for initiating a cooking period, a movable member movable during a cooking period and adapted when in one position to terminate a cooking period, resilient means for urging movement of said member to such position, and means including a thermally responsive member maintaining control of the movable member throughout the duration of any cooking period, the average temperature of said thermally responsive member upon reaching its maximum during such period, causing said thermally responsive member to yield control of said movable member to effect termination of the cooking period, the amount of heat retained by said thermally responsive member producing a coordinated release of the movable member in the next cooking period.

ROBERT SARDESON.